United States Patent
Winebrenner et al.

(10) Patent No.: US 10,059,396 B2
(45) Date of Patent: Aug. 28, 2018

(54) EQUIPMENT ORGANIZER

(71) Applicant: BULLET VENTURES LIMITED, Exeter (GB)

(72) Inventors: Jon Winebrenner, Richmond (CA); James Mallion, Vancouver (CA); Liam Levesque, Vancouver (CA)

(73) Assignee: Bullet Ventures Limited, Exeter (GB)

( * ) Notice: Subject to any disclaimer, the term of this patent is extended or adjusted under 35 U.S.C. 154(b) by 0 days.

(21) Appl. No.: 15/304,244

(22) PCT Filed: Apr. 16, 2015

(86) PCT No.: PCT/US2015/026049
§ 371 (c)(1),
(2) Date: Oct. 14, 2016

(87) PCT Pub. No.: WO2015/161008
PCT Pub. Date: Oct. 22, 2015

(65) Prior Publication Data
US 2017/0043825 A1    Feb. 16, 2017

Related U.S. Application Data

(60) Provisional application No. 61/980,458, filed on Apr. 16, 2014.

(51) Int. Cl.
*B62H 3/12*    (2006.01)
*A47F 7/00*    (2006.01)
(Continued)

(52) U.S. Cl.
CPC ............. *B62H 3/12* (2013.01); *A47F 7/0028* (2013.01); *A47F 7/04* (2013.01); *B62H 3/02* (2013.01)

(58) Field of Classification Search
CPC . B62H 3/12; B62H 3/02; A47F 7/0028; A47F 7/04
(Continued)

(56) References Cited

U.S. PATENT DOCUMENTS 1,459,582 A     6/1923   Dubee
3,809,799 A *   5/1974   Taylor ................... H02G 3/045
                                                           138/106

(Continued)

FOREIGN PATENT DOCUMENTS

JP         50-105149 U    8/1975

OTHER PUBLICATIONS

International Search Report dated Jul. 8, 2015 relating to Patent Cooperation Treaty Application No. PCT/US2015/026049 (Publ. No. WO 2015/161008).

*Primary Examiner* — Muhammad Ijaz
(74) *Attorney, Agent, or Firm* — Donald E. Stout; Stout, Uxa & Buyan, LLP

(57) ABSTRACT

Disclosed is an equipment organizer or storage device for the storage, organization or hanging of various objects in a home or commercial setting. The device comprises an outer part and an inner part engaged into the outer part. The device components may be injection molded from common plastics such as polycarbonate and may optionally be created by 3D printing. The device may be used for storage of sporting equipment, such as bicycles, but may also be easily adapted for storing other items such as musical instruments and household items such as brooms and tools. The inventive device is adapted for ease of installation and use without damage to the stored item or its environment. The inventive device has a small footprint and it functions as an inexpensive storage solution.

13 Claims, 19 Drawing Sheets

(51) Int. Cl.
*A47F 7/04* (2006.01)
*B62H 3/02* (2006.01)

(58) Field of Classification Search
USPC ......... 248/316.1, 316.3, 316.4, 316.5, 316.6, 248/316.7; 211/106.01, 70.6, 60.1
See application file for complete search history.

(56) References Cited

U.S. PATENT DOCUMENTS

| | | | |
|---|---|---|---|
| 4,063,647 A | | 12/1977 | Blackmore |
| 4,932,625 A | | 6/1990 | Hotchkiss, Jr. |
| 5,231,785 A | * | 8/1993 | Roberts ................. A01K 97/10 |
| | | | 248/538 |
| 5,292,009 A | | 3/1994 | Smith |
| 9,677,583 B1 | * | 6/2017 | Wong ........................ F16B 2/12 |
| 2002/0035768 A1 | * | 3/2002 | Gaetke ................... B82Y 35/00 |
| | | | 24/563 |
| 2004/0222172 A1 | * | 11/2004 | Bleazard ................. B62H 3/04 |
| | | | 211/19 |
| 2005/0077332 A1 | | 4/2005 | Parsons |
| 2006/0243686 A1 | * | 11/2006 | Grayson .............. A47B 81/005 |
| | | | 211/70.6 |
| 2013/0015288 A1 | * | 1/2013 | Hernandez ............. F16B 2/245 |
| | | | 244/3.1 |
| 2016/0331187 A1 | * | 11/2016 | Beebe ..................... A47J 47/16 |
| 2017/0043825 A1 | * | 2/2017 | Winebrenner ........... A47F 7/04 |

* cited by examiner

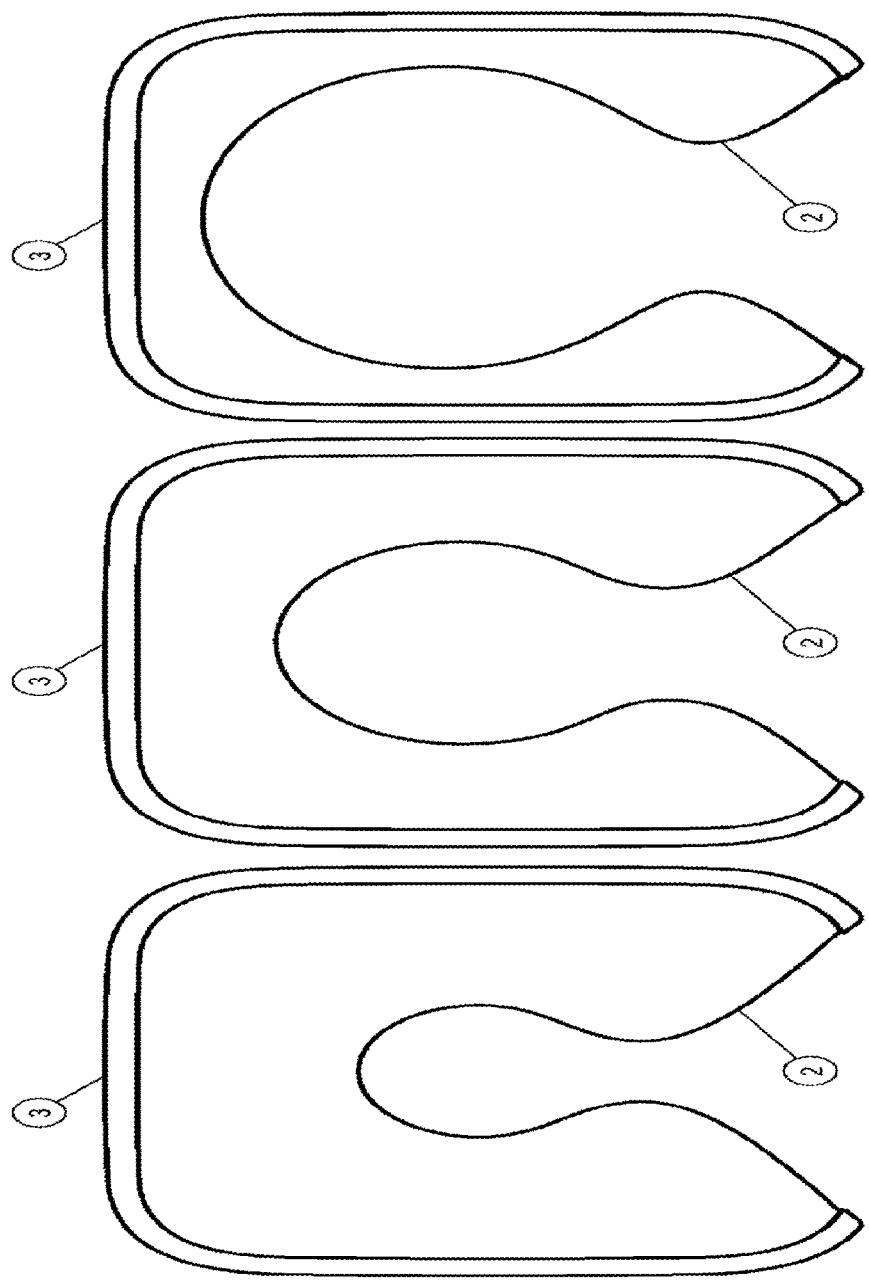

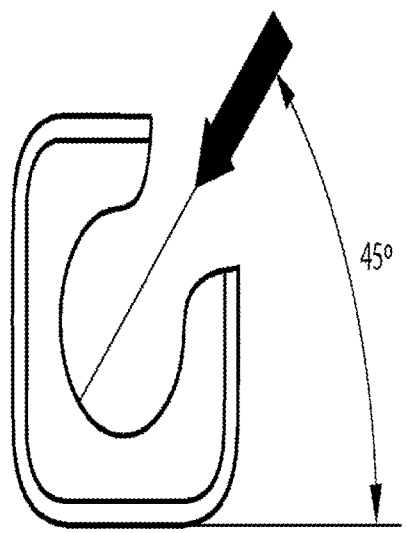
FIG. 12a
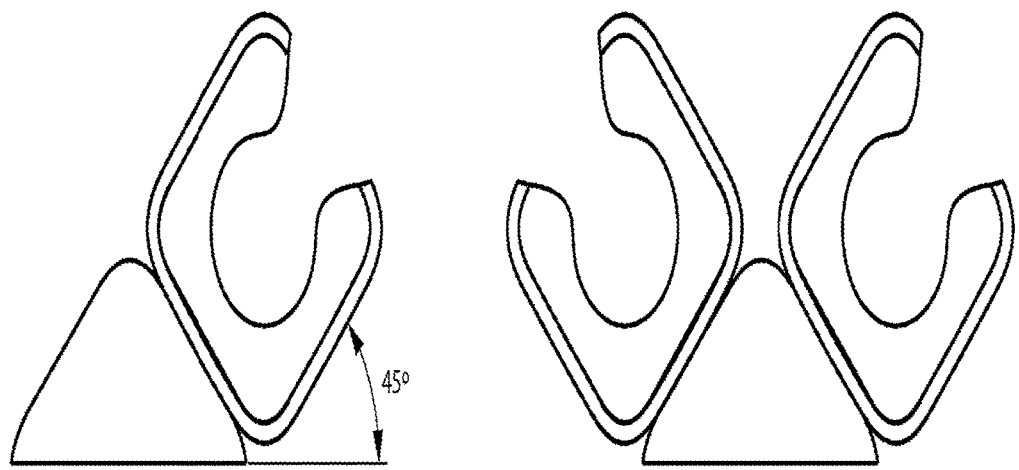
FIG. 12b
FIG. 12c

EQUIPMENT ORGANIZER

FIELD OF THE INVENTION

The present invention relates to the field of equipment organizers for the storage of various items. More specifically, this invention relates to an equipment organizer apparatus for the storage, hanging or attaching of various items in a home or commercial environment. The invention may commonly be used for the hanging or storage of various common sporting or recreational items, such as bicycles, skis or musical instruments. The inventive apparatus is well adapted to any storage or attachment task where a sturdy, durable and compact solution is desired for storing the subject item while minimizing space used and providing for easy installation and maintenance.

BACKGROUND OF THE INVENTION

Current solutions for the storage and/or attachment of sporting goods, recreational items and other household items tend to be cumbersome, large, difficult to install and use, and they have the potential to cause damage to the walls they are attached to or the floors they rest on. They may also cause damage to the item being stored due to choice of materials in the storage devices or the manner in which the storage devices interact with the item being stored.

Taking the example of currently available bicycle storage racks and hooks, they tend to have all of the above drawbacks. For example, various wall-mounted frame rests are available to hang bicycles horizontally on walls. All of the known wall-mounted racks of this type operate by mounting the often heavy and large rack to a wall, usually requiring a relatively difficult and invasive installation. Either through wear and tear on the rack once installed, or simply through design limitations, these racks also have the potential to damage the bicycle at the point where the rack touches the bike. These racks are most suitably configured for bicycles with flat top tubes and they can challenge users with the need to lift the entire bike off the floor to hang it.

Wall-mounted wheel hooks are also known for hanging bicycles. These devices typically operate by placing the hook through the wall or ceiling surface into a wall stud for a secure installation, thus requiring a more difficult and/or invasive installation. With these devices, the bicycle is typically hung by engaging the front wheel rim to the hook and allowing the bike to sit vertically with the rear wheel touching the wall. These devices create the potential for damage to the bicycle rim and/or wheel spokes and they can be difficult for users because of the need to lift the entire weight of the bicycle in a vertical position and engage the hook between the spokes the bicycle wheel.

Other wall-mounted solutions are known, such as wall-leaning frame rests and floor to ceiling frame rests. These solutions may not require a complicated and invasive installation, but may still require users to lift the entire weight of one or more bicycles, which can be considerable with a mountain or hybrid type bicycle (in the range of 13-15 kg or more). Also, because the racks are not securely attached to a wall, there is the potential for them to fall over or otherwise become unstable. Finally, these racks still take up considerable space in a home or commercial environment.

There are also various floor-mounted blocks for storing bicycles in their natural horizontal position. These block-type racks may not require significant installation and some may not consume significant space, but they have the potential to be unstable and to be prone to user error, thus potentially resulting in falling bicycles, causing user injury or damage to the bicycle.

Ceiling mounted bicycle racks and hooks are also known. These racks likely have the most complicated and challenging installation requirements due to the need to mount them into ceiling joists for a secure installation. Also, many users will be challenged by the need to lift their bicycle above their heads to store it. Finally, the risk of user injury during the storage process or resulting from an improperly installed rack is large.

Many of the known solutions have the already highlighted limitation of the potential for an incorrect installation and resulting consequences including personal injury from items falling from height. Not all users will perform a proper installation of a fully weight bearing rack or hook into a wall stud or using wall plugs. This can result in the rack or hook pulling away from the wall when the weight of an item such as a bicycle is placed on the rack. Clearly, a bicycle falling from overhead could cause severe personal injury, particularly to children, and perhaps particularly when occurring from a ceiling-mounted bicycle rack.

Currently the majority of ski storage racks consist of two posts (dowel rods) that stick out nearly perpendicular to the mounting surface. The skis are then wedged between the two posts and the bend of the ski is then relied upon to hold them off the ground. These dual post racks are typically made out of bent wire or wood.

Another option for storing skis is to have two posts that stick out from the wall approximately 45 degrees above vertical. These two posts are spaced several feet apart and the skis are mounted horizontally onto the two posts.

Accordingly, there is a need for a storage solution for bicycles and other items that is stable and secure, simple and easy to install, space saving in terms of reducing the required footprint, able to keep the stored item from coming into contact with walls, and also a solution that is neat and tidy and prevents stored items from leaning on each other or becoming intertwined when multiple items are stored. The solution should also provide ease of use and should not require the user to lift the full weight of a bicycle or other stored item off the floor to store it. Therefore, the aim of the present inventors is to provide a storage solution with the above attributes.

SUMMARY OF THE INVENTION

The current invention comprises an equipment organizer for the organization and storage of items such as sporting goods, musical instruments and other items in a home or commercial environment.

Taking the example of an equipment organizer for the storage of bicycles, the inventive device comprises two main components. An outer part is attached to a wall using, for example, screws or an adhesive. An inner part snaps into the outer clip using the tension in the outer clip. Various aspects of the stored bicycle, such as the tire or a handlebar are then placed into the inner part and are held in place.

Again, taking the non-limiting example of storing a bicycle with the inventive device, the bicycle may be stored perpendicular to the floor by resting the back wheel on the floor and engaging the front tire into the inner part of the inventive device. In an alternative configuration, a component of a handlebar may be engaged into the inner part of the inventive device with the bicycle resting horizontally on the floor. Each of these options for storage does not require the device to be bearing the full weight of the bicycle as the majority of the bicycle's weight will be borne by the floor with the device simply preventing the bike from falling over or backwards. Each of these options for storage also does not require the user to lift the full weight of the bicycle off the floor to store the bicycle.

The inventive device can be constructed from injection-molded polycarbonate, but one of skill in the art will realize that alternative constructions are possible from other types of plastic or even other materials with the desired durability and flexibility attributes, amongst other requirements.

The inventive device can be adapted for use in storing many sporting goods and other household and commercial items. Adaptation of the device can be accomplished through varying the dimensions of the inner part and, in certain situations, by varying the dimensions of the inner part and outer part. In most applications, the inventive device will not be deployed in a situation requiring the bearing of significant weight and, thus, significant varying of materials and/or tolerances is not commonly required.

BRIEF DESCRIPTION OF FIGURES

The invention will be better understood according to the following detailed description of several embodiments with reference to the attached drawings, in which:

FIG. 3b shows a top elevation view of the outer part shown in FIG. 3a;

FIG. 3c shows a front elevation view of the outer part shown in FIG. 3a;

FIG. 4b shows a perspective view of the inner part shown in FIG. 4a;

FIG. 4c shows a rear elevation view of the inner part shown in FIG. 4a;

FIG. 4d shows a right side elevation view of the inner part shown in FIG. 4a;

FIG. 5b shows a top elevation view of the inventive device shown in FIG. 5a;

FIG. 5c shows a right side elevation view of the inventive device shown in FIG. 5a;

FIG. 5d shows a cross-sectional view of the inventive device shown in FIG. 5a taken along the lines B-B in. FIG. 5c;

FIG. 6b shows a top elevation view of the embodiment shown in FIG. 6a;

FIG. 7b shows a top elevation view of the embodiment shown in FIG. 7a;

FIG. 8b shows a top elevation view of the embodiment shown in FIG. 8a;

FIG. 9b shows a top elevation view of the embodiment shown in FIG. 9a;

FIG. 11a shows a top elevation view of a schematic representation of an outer part of the inventive device fit with an inner part configured of accommodate a specific tire size;

FIG. 11b shows a top elevation view of the inner and outer parts shown in FIG. 11a configured to accommodate a specific tire size;

FIG. 11c shows a top elevation view of the inner and outer parts shown in FIG. 11a configured to accommodate a specific tire size;

FIG. 12a shows a top elevation view of a schematic representation of an embodiment of the present invention mounted at a 45° angle;

FIG. 12b shows a top elevation view of a schematic representation of an embodiment of the present invention mounted at a 45° angle;

FIG. 12c shows a top elevation view of a schematic representation of an embodiment of the present invention mounted at a 45° angle adjacent to the FIG. 12b embodiment;

FIG. 13a shows a perspective view of a schematic representation of how a strap can be used with the inventive device for added security;

FIG. 13b shows an expanded view of Detail A of the device shown in FIG. 13a;

DETAILED DESCRIPTION OF THE INVENTION

The current invention comprises an equipment organizer for the organization and storage of items such as sporting goods, musical instruments and other items in a home or commercial environment.

Taking the example of an equipment organizer for the storage of bicycles, the inventive device comprises two main components. An outer part is attached to a wall using screws or other fasteners or an adhesive. An inner part snaps into the outer clip using the tension in the outer clip. Various aspects of the stored bicycle, such as the wheel rim or a handlebar are then placed into the inner part and are held in place.

Again, taking the non-limiting example of storing a bicycle with the inventive device, the bicycle may be stored perpendicular to the floor by resting the back wheel on the floor and engaging the front wheel rim into the inner part of the inventive device. In an alternative configuration, a component of a handlebar may be engaged into the inner part of the inventive device with the bicycle resting horizontally on the floor. Each of these options for storage does not require the device to be bearing the full weight of the bicycle as the majority of the bicycle's weight will be borne by the floor with the device simply preventing the bike from falling over or backwards.

The inventive device can be constructed from injection-molded polycarbonate, but one of skill in the art will realize that alternative constructions are possible from other types of plastic or even other materials with the desired durability and flexibility attributes, amongst other requirements. Solely by way of example, the outer part may be constructed of wood, carbon fiber or metal. The inner part may be constructed of rubber, or may be two-shot injection molded to accommodate the storage of sensitive items.

Figures 14A, 14B:
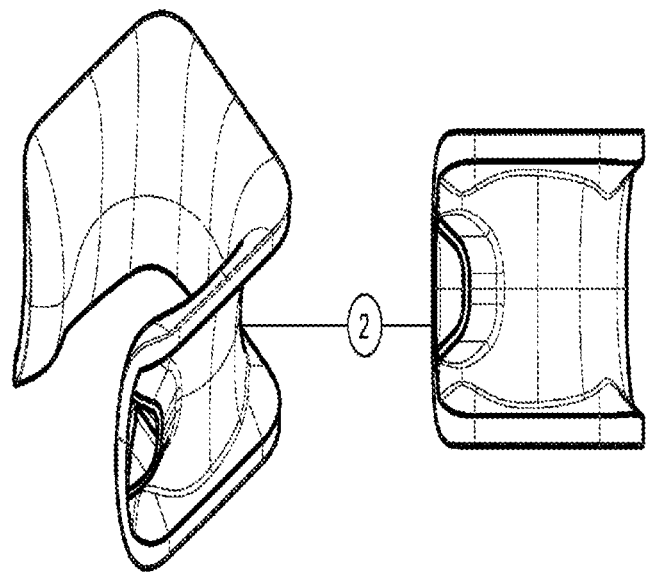
FIG. 14a shows a perspective view of a schematic representation of how the design of the inner portion of the inventive device can be modified for 3D printing.
FIG. 14b shows a right side elevation view of how the inner portion shown in FIG. 14a can be modified for 3D printing.
Figures 14C, 14D:
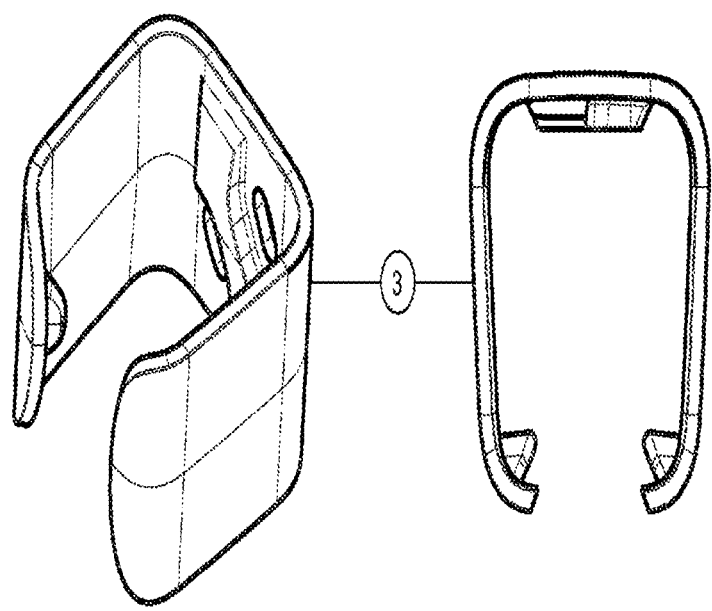
FIG. 14c shows a perspective view of a schematic representation of how the design of the outer portion of the inventive device can be modified for 3D printing.
FIG. 14d shows a right side elevation view of how the outer portion shown in FIG. 14c can be modified for 3D printing.
Figure 15:
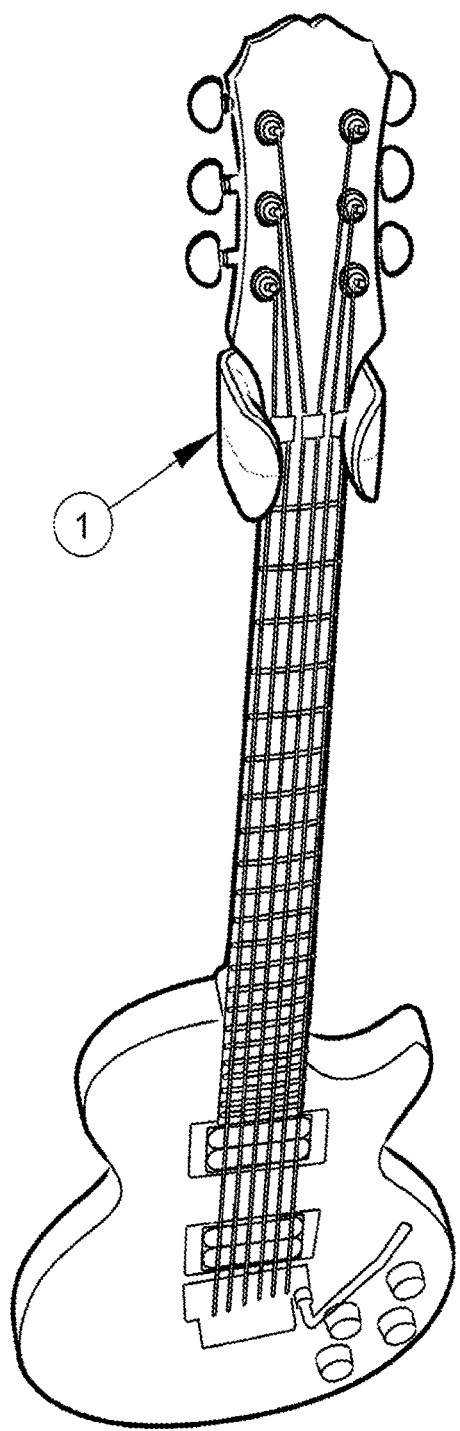
FIG. 15 shows a perspective view of how the inventive device can be adapted to store a guitar according to an embodiment of the present invention.
Figure 16:
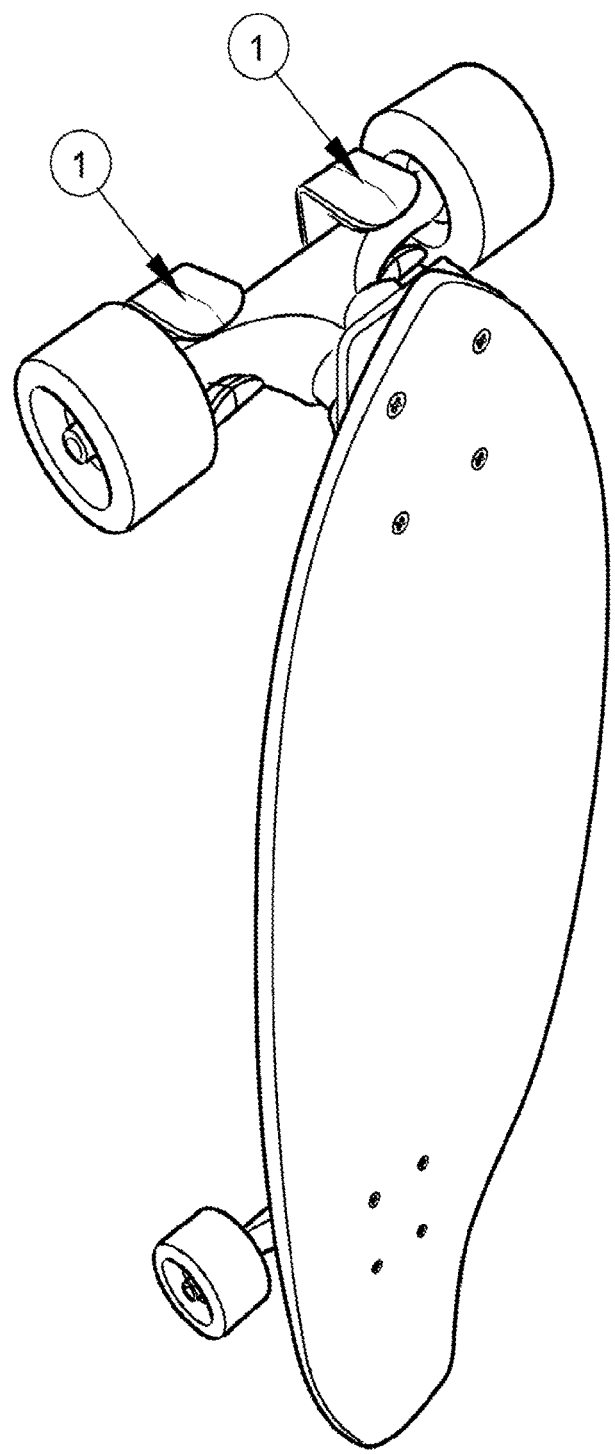
FIG. 16 shows a perspective view of how the inventive device can be adapted to store a skateboard according to an embodiment of the present invention.
Figure 17A:
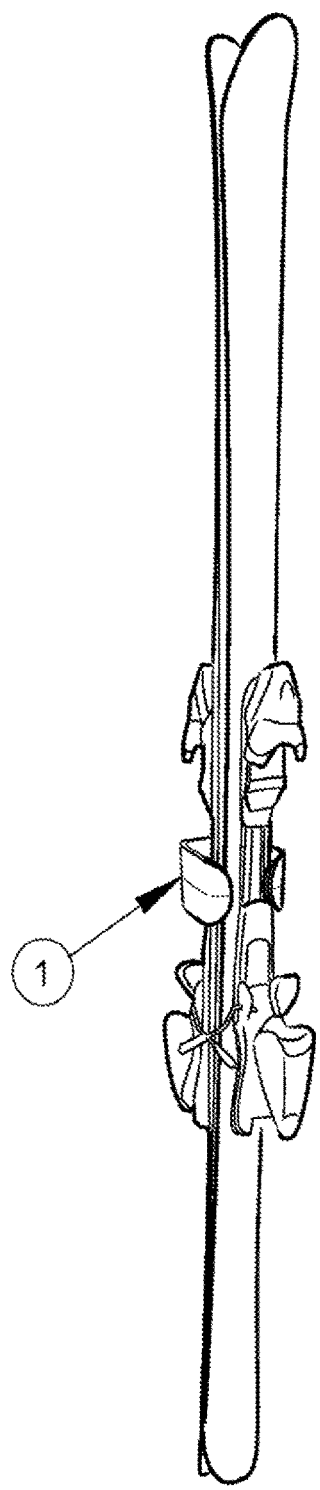
FIG. 17a shows a perspective view of how the inventive device can be adapted to store skis according to an embodiment of the present invention.
Figure 17B:
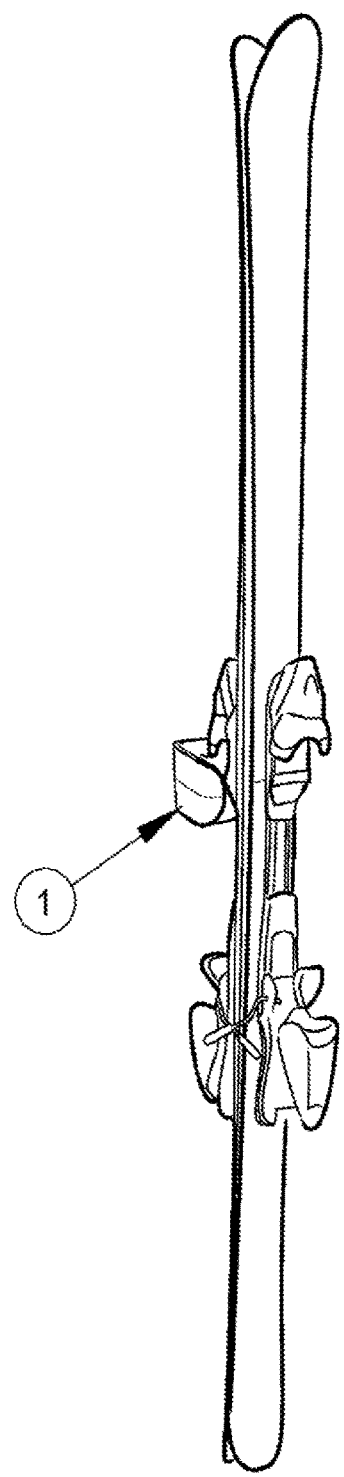
FIG. 17b shows a perspective view of how the inventive device can be adapted to store skis according to an embodiment of the present invention.
Figures 18A, 18B:
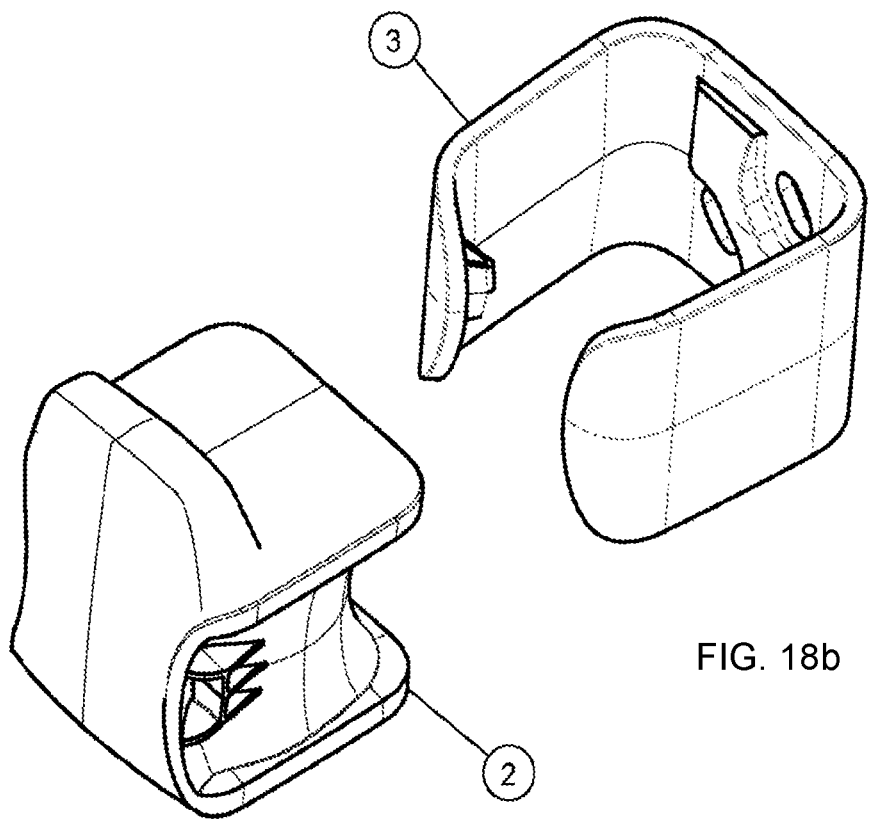
FIG. 18a shows a perspective view of how the inventive device shown in FIG. 17a can be adapted to store skis according to an embodiment of the present invention.
FIG. 18b shows a perspective view of how the inventive device shown in FIG. 17a can be adapted to store skis according to an embodiment of the present invention.

While the inventive device may commonly be constructed from plastic such as polycarbonate using injection molding, it may also be constructed by non-traditional methods, such as 3D printing. The use of 3D printing may require modification of the design of the inventive device so that the layers of plastic constructed during the 3D printing process build properly and so as to maintain structural integrity, as shown in FIG. 14.

Figure 1A:
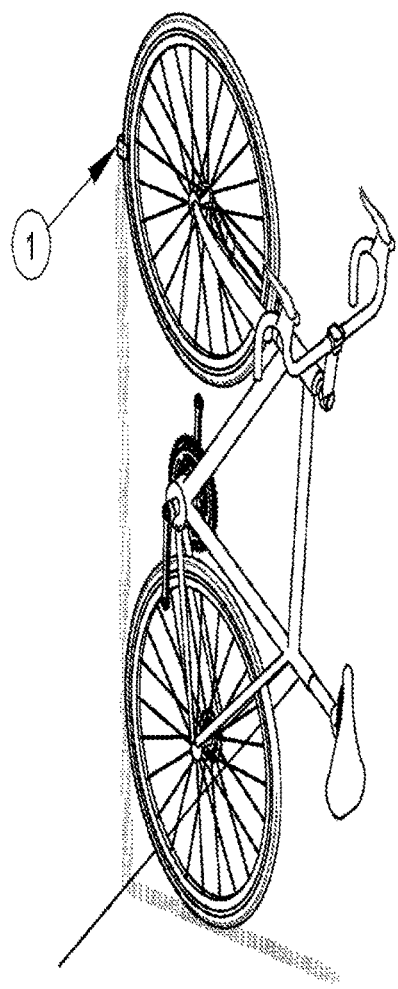
FIG. 1a shows a perspective view of a bicycle stored by engaging the inner part of the inventive device with the bicycle tire according to an embodiment of the current invention.
Figure 1B:
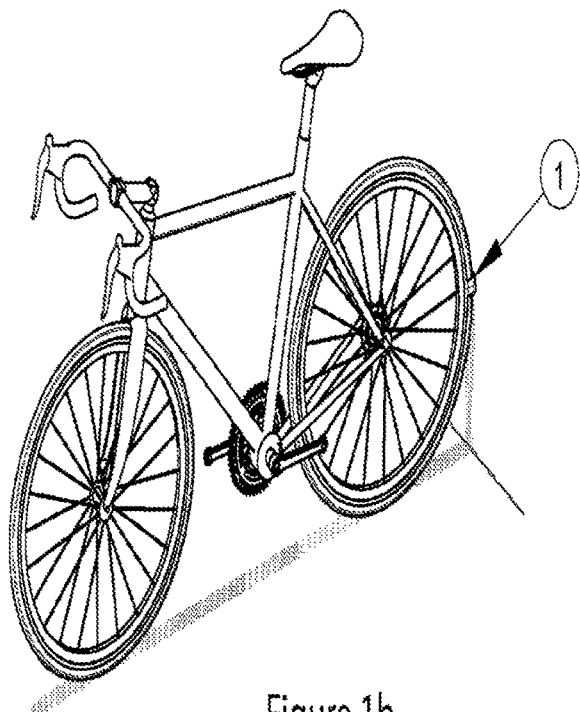
FIG. 1b shows a perspective view of a bicycle stored by engaging the inner part of the inventive device with the bicycle tire according to an embodiment of the current invention.
Figure 2:
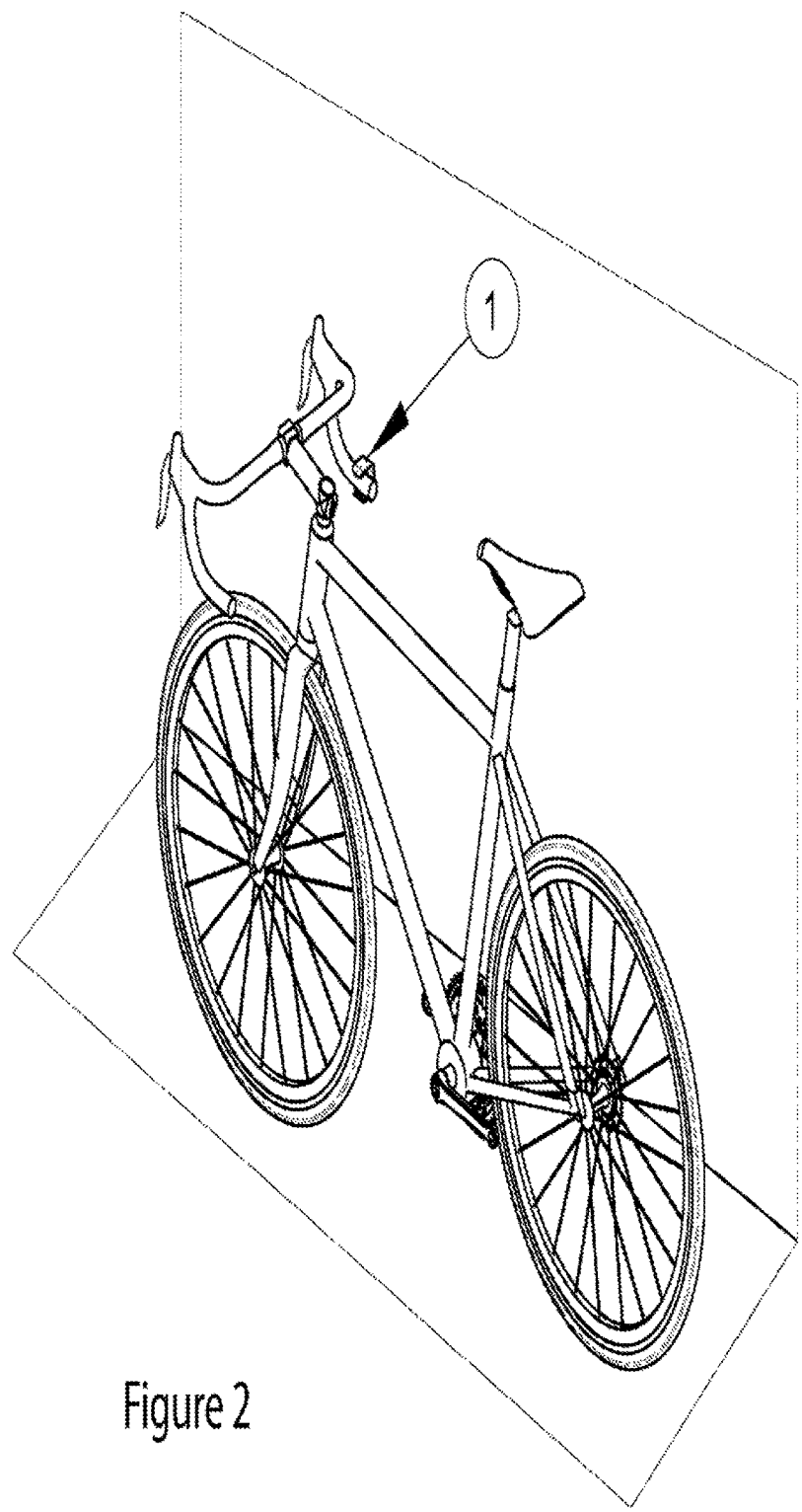
FIG. 2 shows a perspective view of a bicycle stored by engaging the inner part of the inventive device with the bicycle handlebar according to an embodiment of the current invention.
Figure 3A:
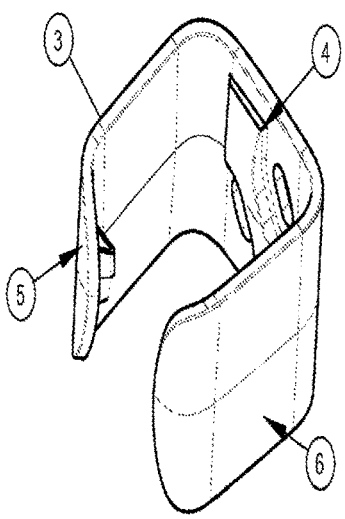
FIG. 3a shows a perspective view of a schematic representation of the outer part of the inventive device.
Figure 3B:
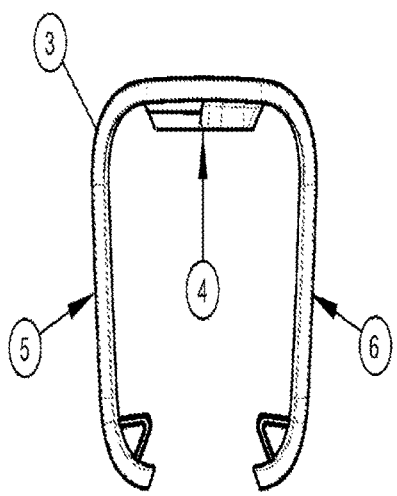
Figure 3C:
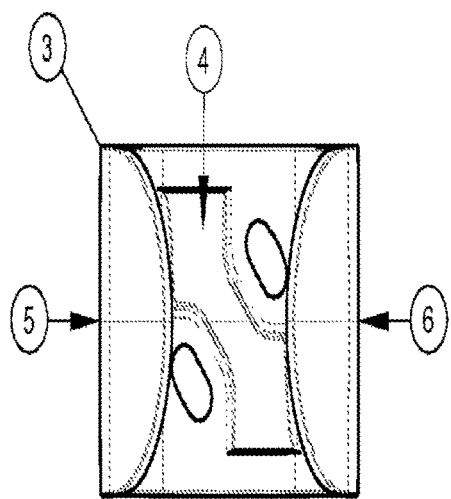
Figure 4A:
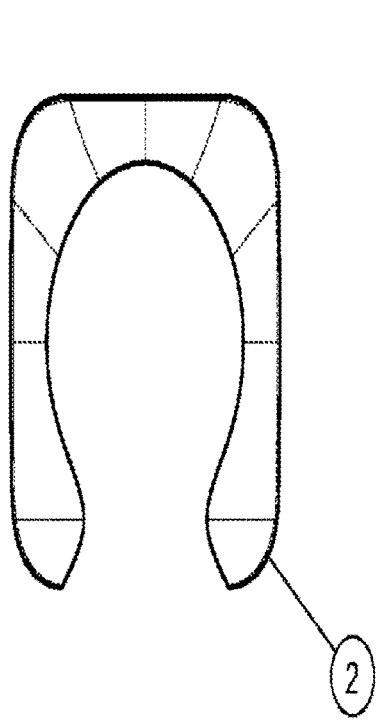
FIG. 4a shows a top elevation view of a schematic representation of the inner part of the inventive device.
Figure 4B:
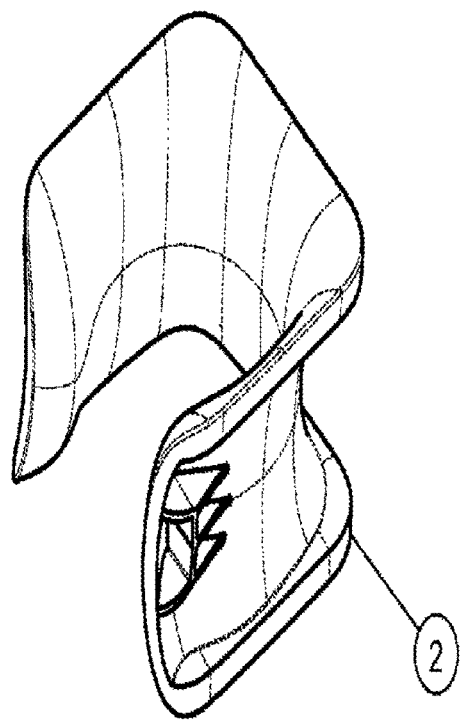
Figure 4C:
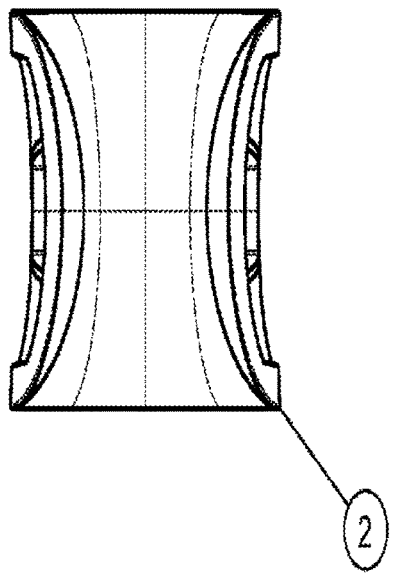
Figure 4D:
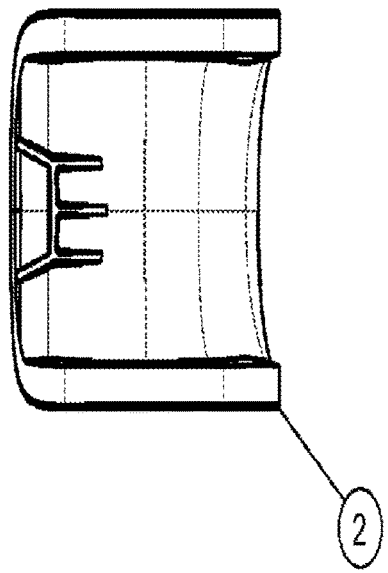
Figure 5A:
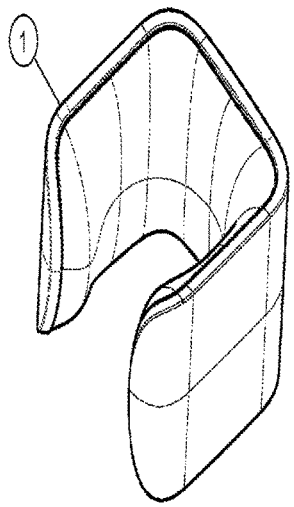
FIG. 5a shows a perspective view of a schematic representation of the outer and inner parts of the inventive device assembled together.
Figure 5B:
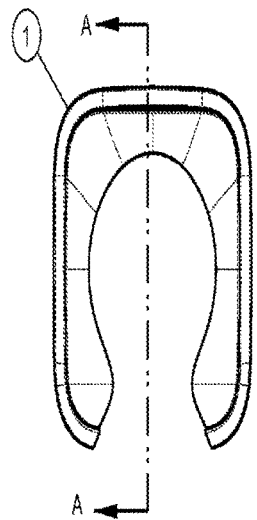
Figure 5C:
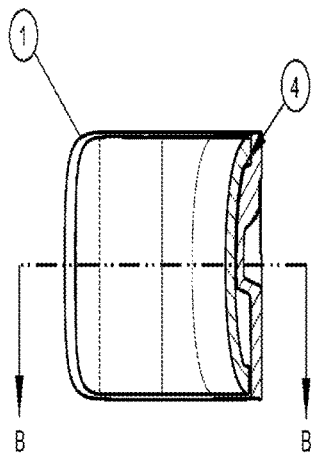
Figure 5D:
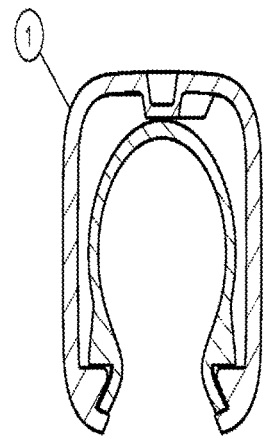
Figure 6A:
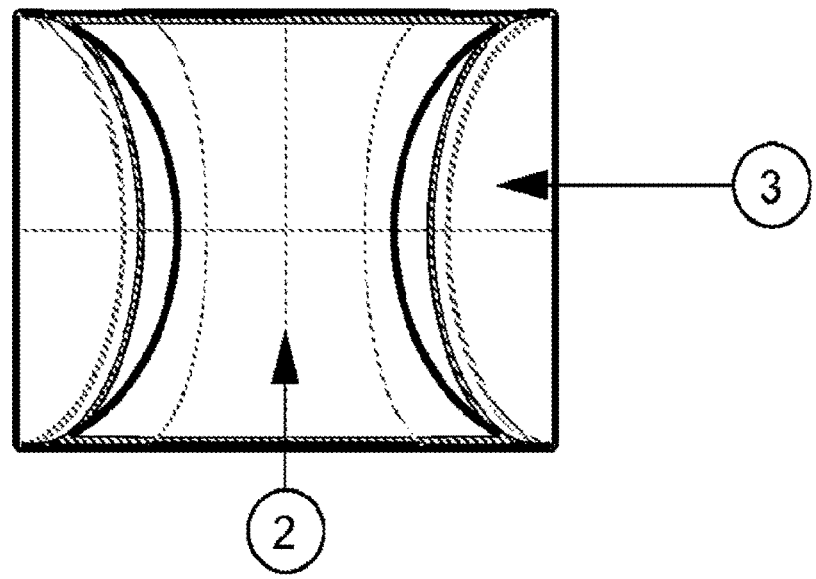
FIG. 6a shows a front elevation view of a schematic representation of an embodiment of the present invention adapted for a road bicycle.
Figure 6B:
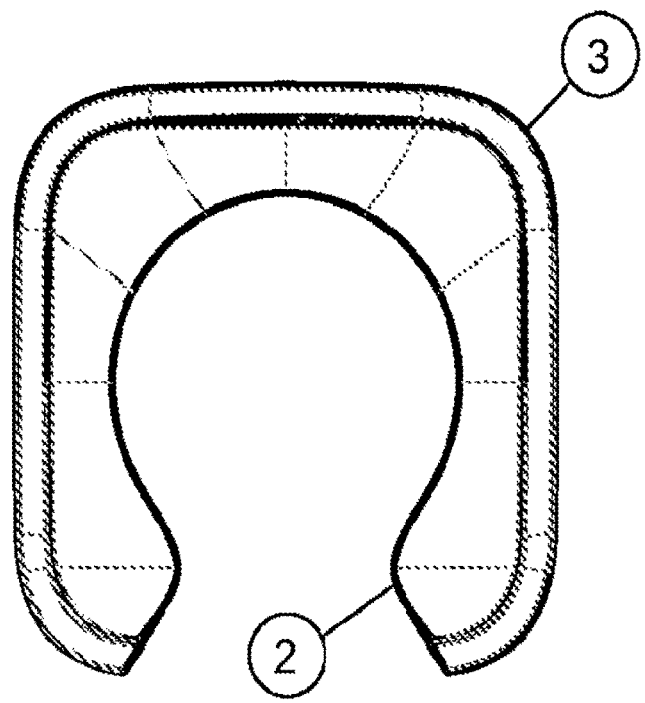
Figure 7A:
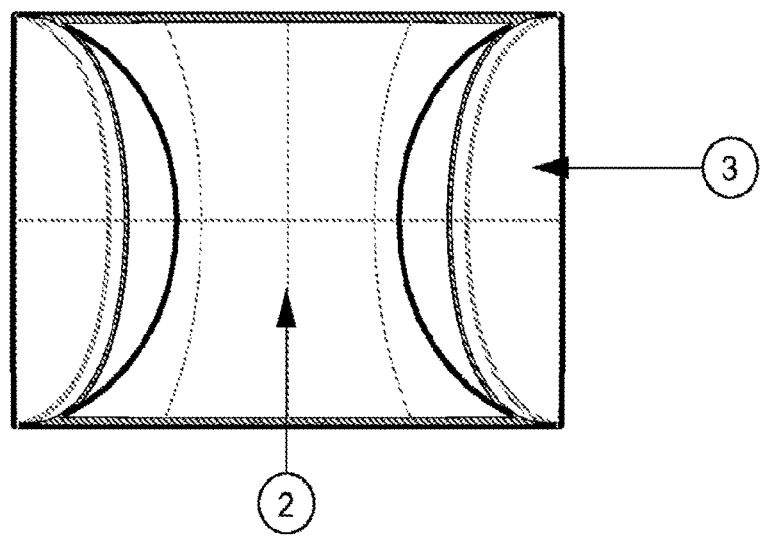
FIG. 7a shows a front elevation view of a schematic representation of an embodiment of the present invention adapted for a hybrid bicycle.
Figure 7B:
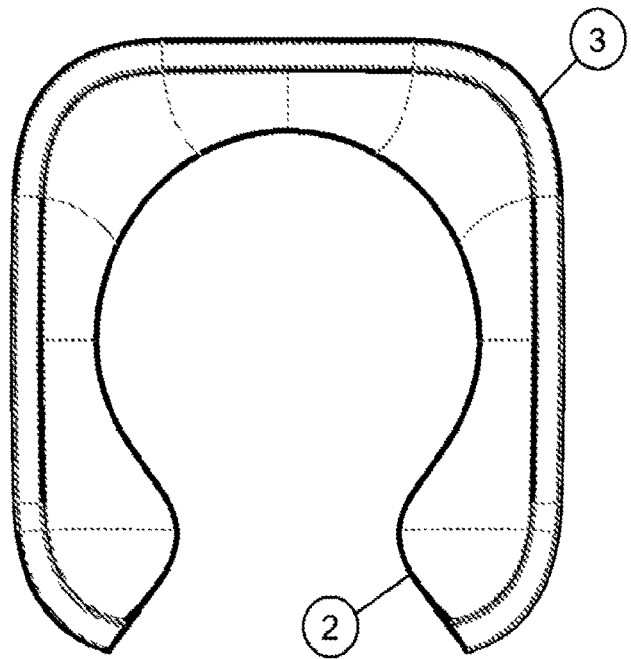
Figure 8A:
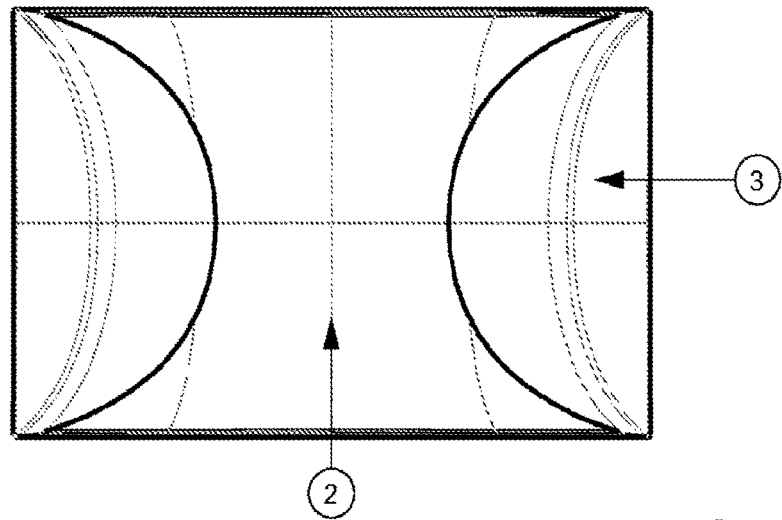
FIG. 8a shows a front elevation view of a schematic representation of an embodiment of the present invention adapted for a mountain bicycle.
Figure 8B:
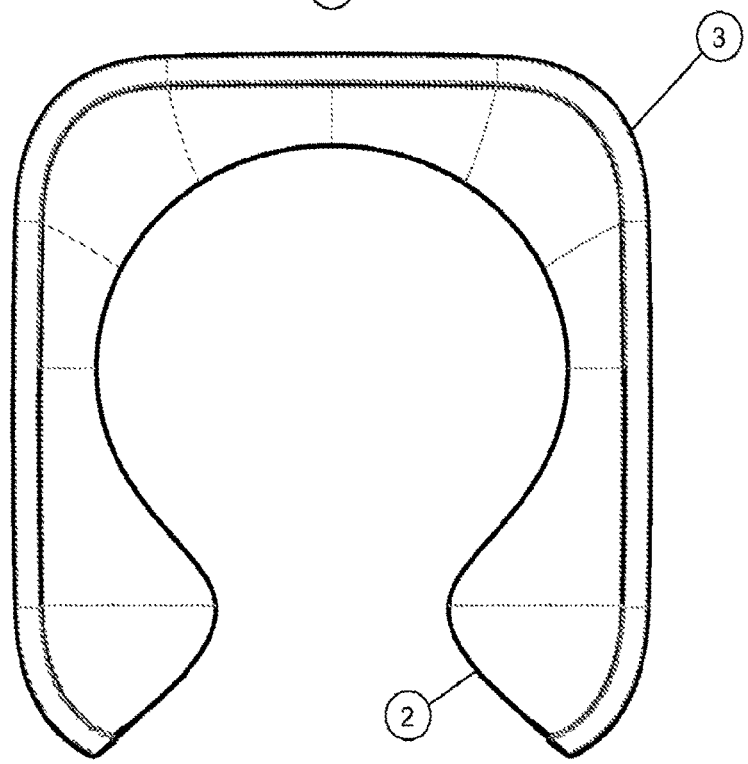
Figure 9A:
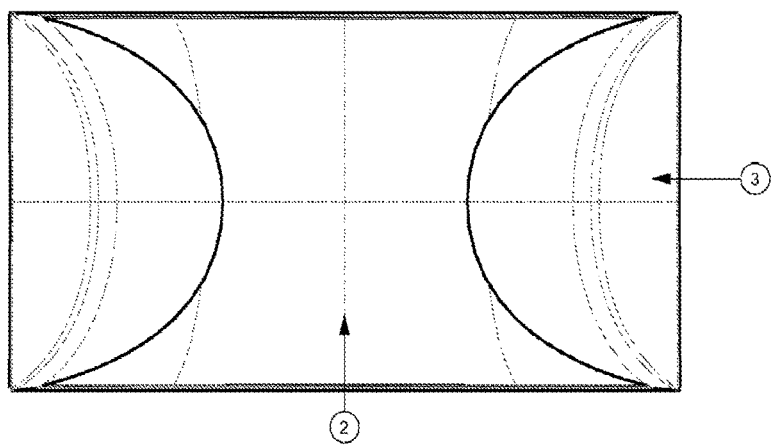
FIG. 9a shows a front elevation view of a schematic representation of an embodiment of the present invention adapted for a fat tire bicycle.
Figure 9B:
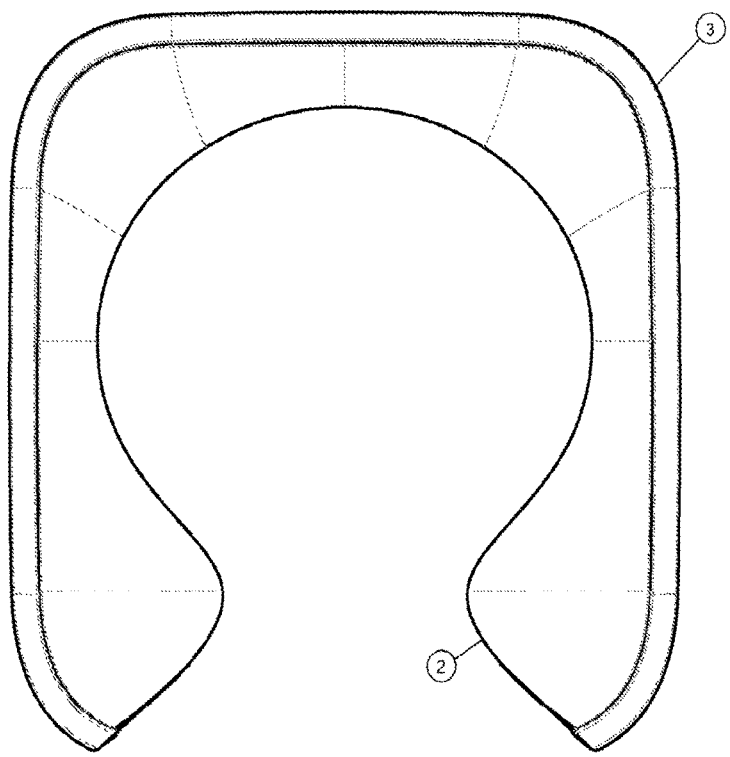

Turning now to the appending figures, and with specific reference to FIGS. 3 through 5, the storage device 1 is comprised of an inner part 2 and an outer part 3. When the storage device 1 is assembled, the inner part 2 is snapped into, or otherwise engaged to, the outer part 3. The inner part 2 is retained in the outer part 3 by virtue of the corresponding dimensions of the inner part 2 and the outer part 3 and may also retained by friction. No adhesive or other fixing mechanism or modality is required.

The outer part 3 has a portion 4 that may be configured to sit flush against the surface that the storage device 1 is mounted to. The outer part 3 also has two arm portions 5, 6, that may sit perpendicular or at an angle away from perpendicular to the flush portion 4. The use of concave angles on the two arm portions 5, 6 allows for inward pressure, which facilitates the inner part 2 and outer part 3 fitting together and also facilitates the consistent holding of the item to be stored.

The inner part 2 may have a curved geometry throughout its cross-section which provides the part with better strength and retention capabilities and also allows for easier insertion of a stored item such as a bicycle tire. The inner part 2 also may have a highly polished surface which provides for a clinging interface which may be advantageous when retaining an item such as a bicycle tire.

Turning now to FIGS. 6 through 9, the storage device may be configured with different sizes and geometries to the inner part 2 and outer part 3 to accommodate different sized and shaped objects. For example, the in case of bicycle tires, FIGS. 6 through 9 show different geometries for accommodating road, hybrid, mountain and fat tire bikes. In each case, the height and width of the inner part 2 and outer part 3 vary, along with the curvature of the inner surface of the inner part 2 and the angle of the opening through which the bicycle tire or other item to be retained would pass.

With further reference to FIGS. 6 through 9, the angle of the opening through which the retained item would pass is, for example, smaller for a road bicycle tire than it is for a mountain bicycle tire. In addition, the curvature of the inner part 2 varies depending on the bicycle tire to be retained and may be more flat for a road bicycle tire with no knobs than for a mountain bicycle tire with knobs.

Two openings may be provided in the flush part 4 of the outer part 3 for mounting the outer part 3 to a surface, which may be a wall or other supporting structure. The mounting may be accomplished with screws or other fastening devices. In the alternative, the storage device may also be attached to a mounting surface with an adhesive modality. In either case, the storage device should be securely attached to the mounting surface but does not need to be mounted in a manner whereby the storage device could bear the full weight of a heavy object such as a bicycle. The storage device is designed to be mounted such that the weight of the a bicycle is borne by the floor or similar weight bearing object (e.g. a table).

While the functionality of holding a bicycle by its tire requires the weight of the bicycle to be borne by the floor, other objects that may be held by the inventive device without the weight of the object being borne by the floor or alternative weight bearing object. For example, a hockey stick may be pressed into the opening and the friction of the two arms pressing inwards upon the hockey stick provides enough friction to overcome the pull of gravity on the object. This same modality of support can be applied to countless other objects.

Figures 10A, 10B, 10C, 10D:
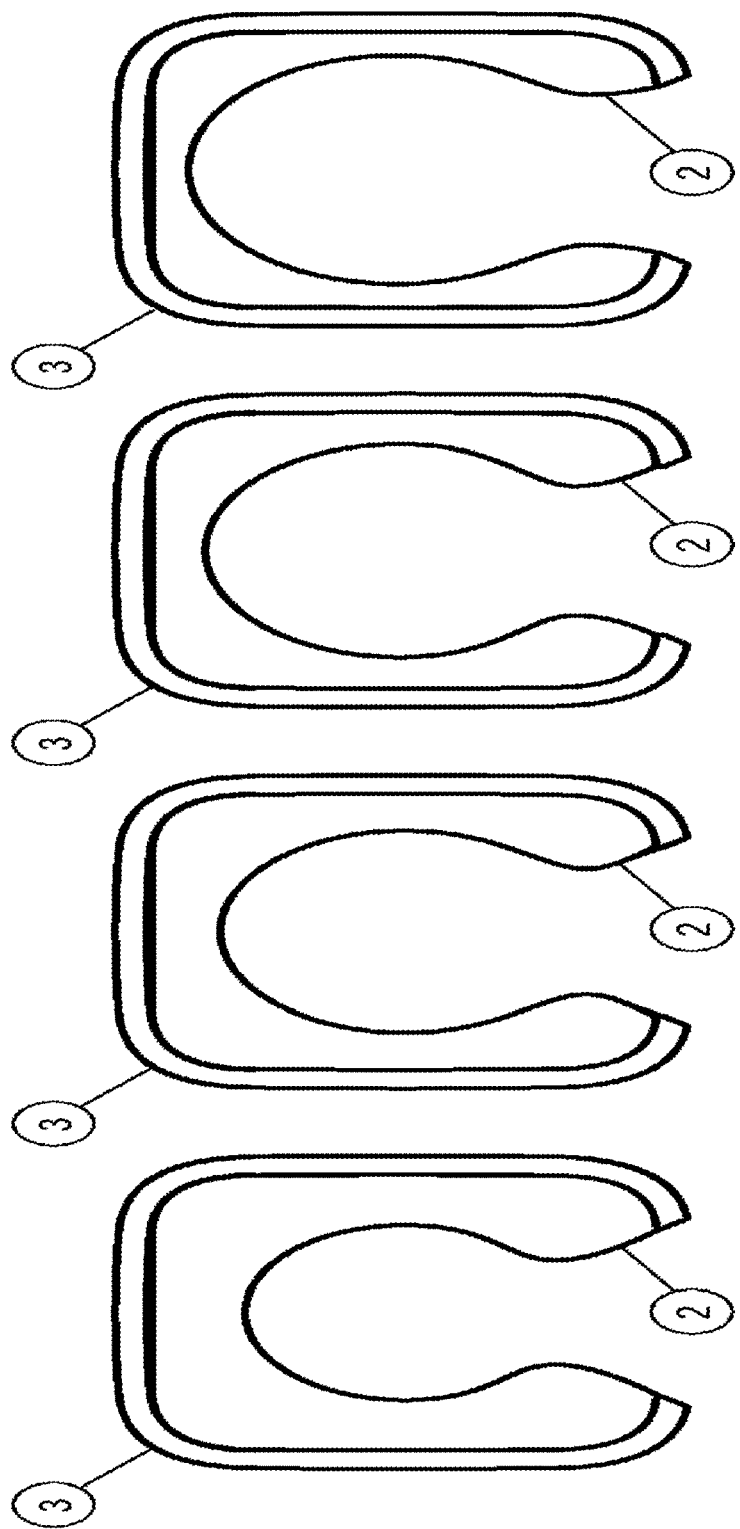
FIG. 10a shows a top elevation view of a schematic representation of an outer part of the inventive device fit with an inner part configured of accommodate a specific tire size.
FIG. 10b shows a top elevation view of the inner and outer parts shown in FIG. 10a configured to accommodate a specific tire size.
FIG. 10c shows a top elevation view of the inner and outer parts shown in FIG. 10a configured to accommodate a specific tire size.
FIG. 10d shows a top elevation view of the inner and outer parts shown in FIG. 10a configured to accommodate a specific tire size.

With reference now to FIGS. 10 and 11, the storage device may be constructed with a uniform outer part 3 matched with inner parts 2 of multiple geometries and curvatures to accommodate different-sized objects. In this way, the inner parts 2 may be designed to accommodate specific-sized objects (FIG. 10) or they may be designed to accommodate objects of a range of sizes (FIG. 11).

With reference now to FIGS. 12a and 12b, one or more of the inventive storage devices may be mounted on a mounting surface at an angle, or the opening through which the stored item would pass may be configured at an angle. In these different embodiments of the invention, the storage device may function to save space even more so than provided by its general compact configuration and design.

Figures 13A, 13B:
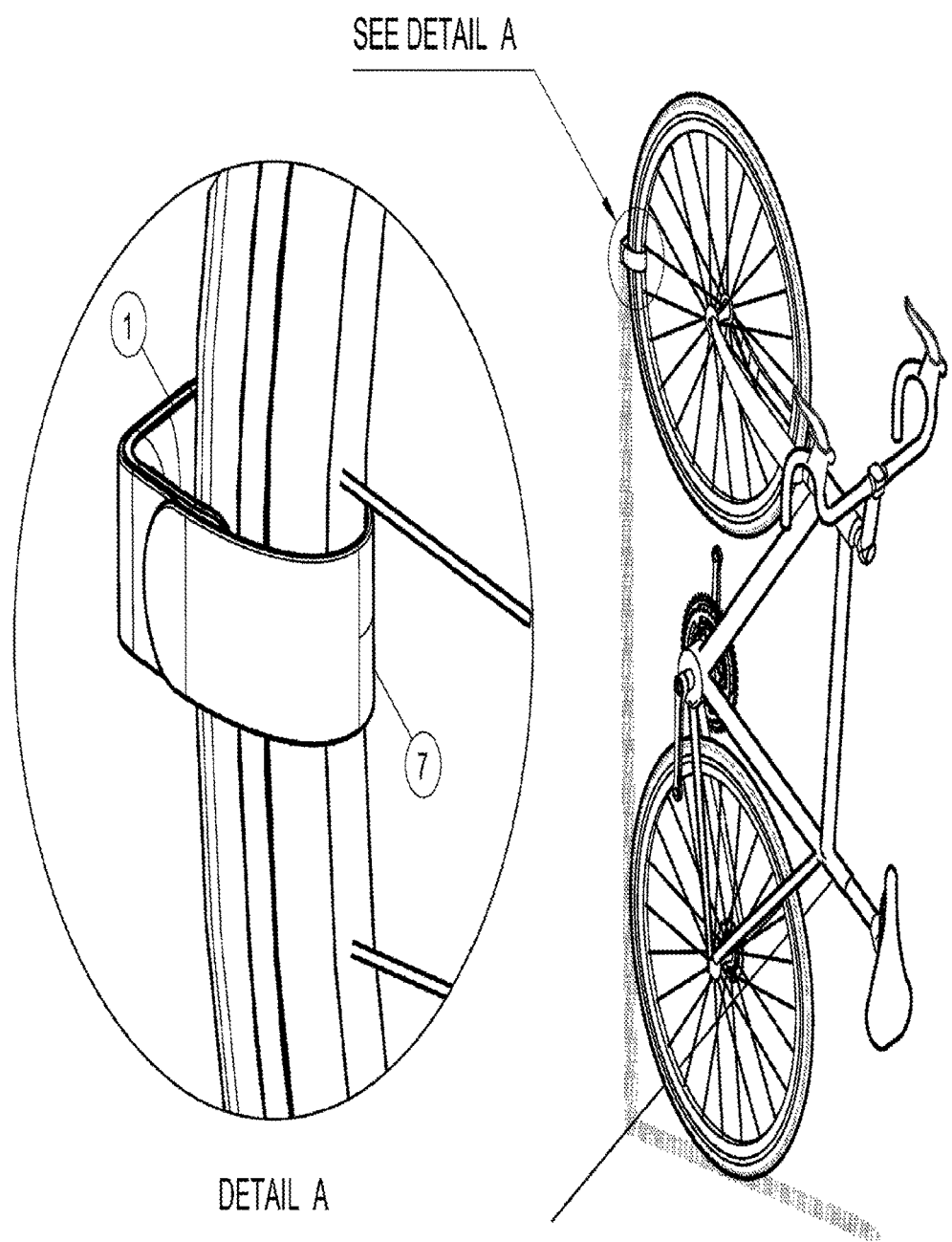

With reference now to FIG. 13, the storage device may be configured with a strap 7 that is optionally affixed by conventional means to the outer surface of the arm portions 4, 5 of the outer part 3. In this embodiment, the user would insert the item to be retained and then guide the strap around the retained object and removably affix it to both arm portions 4, 5 of the outer part 3. While the use of the strap 7 in this embodiment adds security to the overall retention profile of the storage device 1, it is not necessary in most, if not all, applications. In general, the storage device 1 is designed to retain the stored object through the geometry of the inner part 2 and the outer part 3 and additionally friction between the inner part 2 and the retained object.

The storage device 1 can be adapted for use in storing many sporting goods and other household and commercial items. Solely by way of example, and not by way of limitation, the storage device could hold numerous items including guitars, brooms, towels, skis, paddles, hockey sticks, baseballs and hockey pucks. Adaptation of the device can be accomplished through varying the dimensions of the inner part and, in certain situations, by varying the dimensions of the inner part and outer part. In most applications, the inventive device will not be deployed in a situation requiring the bearing of significant weight and, thus, significant varying of materials and/or tolerances is not commonly required. However, one of skill in the art will readily realize that modifications to materials and tolerances may be required to accommodate different items. These modifications will be within the skill set of one of skill in the art.

The storage device 1 can also be used in a configuration of multiple units arranged side by side or in a pre-determined configuration so as to hold multiple items or multiple regions of the same item. For example, multiple units of the inventive storage device 1 could be installed on a mounting surface next to each other and could be configured to hold hockey sticks in the dressing room of a hockey rink. In another example, multiple units of the inventive storage device could be installed in a pre-determined geometry to engage, for example, the rear wheel and front wheel of a bicycle that is positioned horizontally on the ground. While such an arrangement would not be necessary to safely retain the bicycle if the ground is supporting its weight, it may nevertheless be desirable for certain users, for example in a high traffic area where the bicycle may be constantly jostled.

While this invention has been shown and described with reference to particular embodiments thereof, it will be understood by those skilled in the art that various changes in form and details may be made therein without departing from the spirit and scope of the invention as defined by the appended claims.

The invention claimed is:

1. A storage device for holding an item relative to a bearing structure, the storage device comprising:
   an outer clip, and an inner part;
   the outer clip comprising a portion configured to be mounted to a bearing structure, a first arm portion and a second arm portion, each of the first arm portion and the second arm portion extending outwardly from the portion to define a first receiving cavity with the portion, wherein the first arm portion and the second arm portion are biased towards each other, and the portion, the first arm portion and the second arm portion define an inner part engaging surface adjacent to the first cavity; and
   the inner part comprising a base, a first retaining arm and a second retaining arm, each of the first retaining arm and the second retaining arm extending outwardly from the base to define a second receiving cavity with the base, wherein the base, the first retaining arm and the second retaining arm define an item engaging surface adjacent the second cavity and an outer clip engaging surface opposed to the item engaging surface;
   wherein the outer part engaging surface of the inner part is removably engageable with the inner part engaging surface of the outer clip using a tension in the outer clip that allows an inward pressure to be applied on the first retaining arm and the second retaining arm of the inner part by the first arm portion and the second arm portion of the outer clip, the inward pressure facilitating the fitting of the inner part in the first receiving cavity of the outer clip and the holding of an item to be stored in the second receiving cavity of the inner part.

2. The storage device of claim 1, wherein the outer clip is configured to be attached to the bearing structure by screws.

3. The storage device of claim 1, wherein the outer clip is configured to be attached to the bearing structure by an adhesive mechanism.

4. The storage device of claim 1, wherein the bearing structure is a wall.

5. The storage device of claim 1, wherein the inner part is engageable with the outer clip and is held in place solely by friction and corresponding dimensions.

6. The storage device of claim 1, wherein the item to be secured is engageable with the item engaging surface of the inner part and is held in place solely by friction and corresponding dimensions.

7. The storage device of claim 1, further comprising a retaining strap having a first end affixed to an outer surface of one of the first arm portion and the second arm portion of the outer clip, and a second end opposed to the first end that is removably affixable to an outer surface of the other of the first arm portion and the second arm portion of the outer clip.

8. The storage device of claim 1, wherein the outer clip or the inner part, or both, is constructed from plastic.

9. The storage device of claim 8, wherein the plastic is polycarbonate.

10. The storage device of claim 8, wherein the outer clip and the inner part are constructed of plastic made by injection molding.

11. The storage device of claim 8, wherein the outer clip and the inner part are constructed of plastic made by 3D printing.

12. The storage device of claim 1, wherein the storage device is configured to store a bicycle and the storage device is not configured to bear the full weight of the said bicycle.

13. The storage device of claim 1, wherein each of the first arm portion and the second arm portion extends at a concave angle from the portion.

* * * * *